April 18, 1939.  S. J. WILKERSON  2,155,285
MENSTRUAL APPLIANCE
Filed Jan. 21, 1939

S. J. Wilkerson INVENTOR.
BY Hiram A. Sturges
ATTORNEY.

Patented Apr. 18, 1939

2,155,285

UNITED STATES PATENT OFFICE 2,155,285

MENSTRUAL APPLIANCE

Sterling J. Wilkerson, Omaha, Nebr.

Application January 21, 1939, Serial No. 252,167

3 Claims. (Cl. 128—285)

This invention relates to a menstrual appliance, and has for one of its objects to provide an appliance of this kind which will be more effective and convenient than usual in placing and maintaining the absorbent element in the vagina in operative position.

Another object is to provide an appliance which will be durable and may be repeatedly used, this being an economical feature and an improvement over other appliances of this class since, so far as observed, it has generally been the custom to destroy each appliance after use.

The invention includes a menstrual appliance of detachable parts which may be conveniently cleaned and kept in sanitary condition, said parts being few and simple and adapted to be manufactured at a limited cost.

Other objects of the invention will appear in a full and clear description herein. The invention consists of the new and useful construction, combination and arrangement of parts as described herein and claimed, and as illustrated in the accompanying drawing, it being understood that changes may be made in form, size, proportion of parts, minor details and quality and kinds of material used for construction, said changes being within the scope of the invention as claimed.

Figure 1:
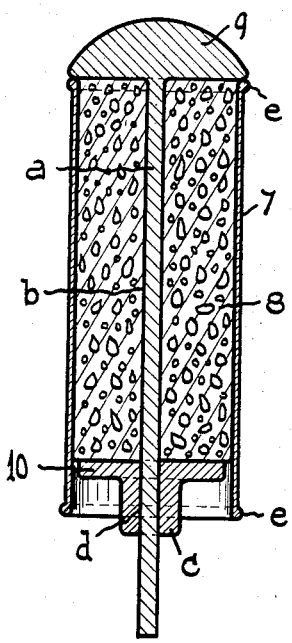
Fig. 1 is a view of the menstrual appliance in longitudinal section.
Figure 2:
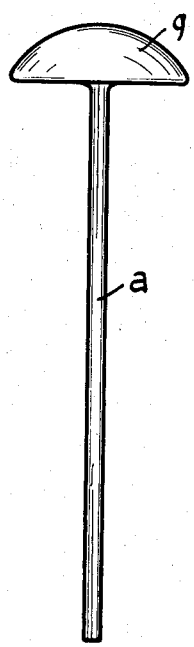
Fig. 2 is a view in side elevation of a flexible cap and its control-strand.
Figure 3:
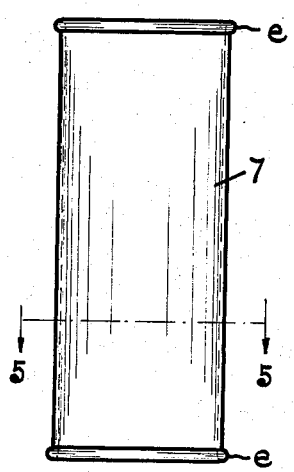
Fig. 3 is a side view of a cylinder.
Figure 4:
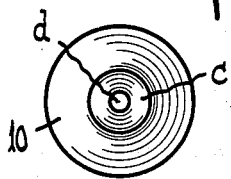
Fig. 4 is a plan view of a slidable control-disc and handle.
Figure 5:
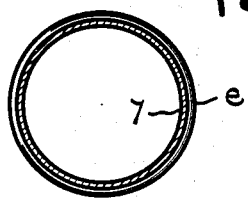
Fig. 5 is a section on line 5—5 of Fig. 3.

Referring now to the drawing for a more particular description, the menstrual appliance consists, in part, of a cylinder 7, an absorbent element 8 adapted to be compressed and placed within the cylinder between the cap 9 and slidingly mounted disc 10, said cap being provided with a stem or strand $a$ extending through the passageway $b$, said disc 10 being provided with a handle $c$, a passageway $d$ being provided and extending through the disc 10 and its handle $c$ adapted to receive the strand $a$.

The cylinder 7 is preferably constructed of celluloid and since it preferably has an attenuated wall its ends are reinforced by rings or bosses $e$ on its outer side.

Figure 6:
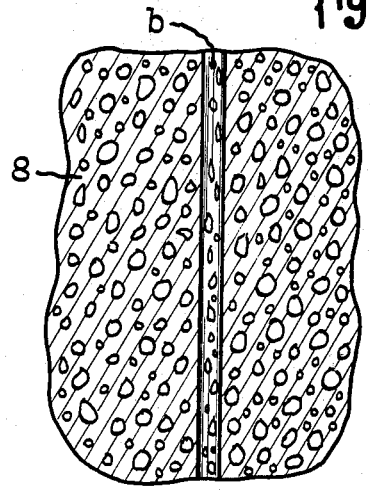
Fig. 6 is a view of an absorbent element in section.

The element 8 preferably consists of sponge and its normal or expanded condition is shown in Fig. 6, and after the sponge has been mounted on the stem or strand $a$ it may be compressed by any suitable means and, together with strand $a$, may be inserted in the cylinder, the cap 9 engaging the end of said cylinder. The disc 10 with its handle $c$ are then mounted in operative position upon the strand or stem $a$ and may be pressed into the cylinder.

The disc 10 is of such diameter that it fits loosely in the cylinder, and the strand $a$ is of such diameter that the disc 10 fits it very closely, but may be forcibly moved to cause additional compression of the sponge.

The cap 9 and its strand are preferably constructed of soft rubber, and the apertured disc 10 and its handle $c$ are preferably constructed of vulcanized rubber.

As thus described, the cylinder 7 may have a sliding movement for removal from the sponge and other parts of the device, and when thus removed, the sponge will automatically expand and will assume its normal size shown in Fig. 6, and since the disc will remain stationary on the strand unless forcibly removed, it is obvious that the sponge, in its expanded condition will be maintained in operative position between the cap and said disc.

In operation, the parts being disposed as shown in Fig. 1, the device is inserted in the vagina of the user, and after the cylinder has been manually removed the sponge will expand, as above described, and will normally be maintained in operative position, the sponge acting as an absorbent.

In the use of material, the sponge is of very fine quality, the rubber is of such soft degree that any injury to the vagina will be avoided. Since the strand $a$ has an adequate length it may be used for removal of the sponge from its operative position, and it will be appreciated that, since the parts are detachable, they may be conveniently cleaned and kept in sanitary condition for repeated use.

The proportions for the stem or strand $a$, the disc and bore of the cylinder are such that the disc and its handle will not slide on the strand unless manual force is applied to the disc, and since the disc has a diameter appreciably less than the bore of the cylinder, the latter may be readily removed from the sponge.

I claim as my invention:

1. A menstrual appliance comprising a cylinder, an expansible absorbent element in compressed condition within the cylinder, a cap covering an end and having a strand traversing the cylinder through the absorbent element, and an apertured disc slidingly mounted on the strand into engagement with the absorbent element, said disc having such a diameter relative to the bore of the cylinder that it will permit a sliding movement and removal of said cylinder from and permit expansion of said absorbent element.

2. A menstrual appliance comprising a cylinder, a sponge in compressed condition within the cylinder, a cap of soft rubber on an end of the cylinder having a strand extending through the sponge and said cylinder, and a disc on the strand adapted to be moved thereon into the cylinder into contact with the compressed sponge, said disc being normally disposed in disengaged position relative to the cylinder to permit removal of the latter from the sponge and resulting expansion of said compressed sponge.

3. In a menstrual appliance, a cylinder, a compressed sponge in the cylinder, a cap engaging the end of the cylinder and having a strand traversing the sponge, an apertured disc movable on the strand into engagement with the sponge and provided with a handle, the arrangement of parts being that the cylinder may have a sliding movement on the sponge for removal therefrom to permit expansion of said sponge.

STERLING J. WILKERSON.